(12) United States Patent
Harron et al.

(10) Patent No.: US 12,400,683 B2
(45) Date of Patent: *Aug. 26, 2025

(54) GENERATING A VIDEO PRESENTATION TO ACCOMPANY AUDIO

(71) Applicant: GRACENOTE, INC., Emeryville, CA (US)

(72) Inventors: Wilson Harron, Berkeley, CA (US); Cameron Aubrey Summers, Oakland, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,902

(22) Filed: Jan. 9, 2024

(65) Prior Publication Data
US 2024/0144973 A1    May 2, 2024

Related U.S. Application Data

(63) Continuation of application No. 15/474,305, filed on Mar. 30, 2017, now Pat. No. 11,915,722.

(51) Int. Cl.
| | |
|---|---|
| *G11B 27/031* | (2006.01) |
| *G06F 16/438* | (2019.01) |
| *G06F 16/73* | (2019.01) |
| *G06F 16/783* | (2019.01) |

(52) U.S. Cl.
CPC ......... *G11B 27/031* (2013.01); *G06F 16/438* (2019.01); *G06F 16/73* (2019.01); *G06F 16/7834* (2019.01)

(58) Field of Classification Search
CPC ............ G11B 27/031; G06F 17/30787; G06F 17/30823
See application file for complete search history.

(56) References Cited

U.S. PATENT DOCUMENTS

| | | | | |
|---|---|---|---|---|
| 5,668,639 A | * | 9/1997 | Martin ................... | G11B 27/34 360/13 |
| 5,995,095 A | * | 11/1999 | Ratakonda ............ | G06F 16/786 715/255 |
| 7,127,120 B2 | * | 10/2006 | Hua ..................... | G11B 27/034 382/254 |

(Continued)

FOREIGN PATENT DOCUMENTS

EP            690413 A2 *    1/1996     ..... G06F 17/30802

*Primary Examiner* — Gelek W Topgyal
(74) *Attorney, Agent, or Firm* — McDonnell Boehnen Hulbert & Berghoff LLP

(57) ABSTRACT

Example methods and systems for generating a video presentation to accompany audio are described. The video presentation to accompany the audio track is generated from one or more video sequences. In some example embodiments, the video sequences are divided into video segments that correspond to discontinuities between frames. Video segments are concatenated to form a video presentation to which the audio track is added. In some example embodiments, only video segments having a duration equal to an integral number of beats of music in the audio track are used to form the video presentation. In these example embodiments, transitions between video segments in the video presentation that accompanies the audio track are aligned with the beats of the music.

20 Claims, 9 Drawing Sheets

(56) References Cited

U.S. PATENT DOCUMENTS

| | | | | |
|---|---|---|---|---|
| 7,362,946 B1* | 4/2008 | Kowald | H04N 5/76 | 360/13 |
| 8,189,114 B2* | 5/2012 | Petersohn | G11B 27/28 | 348/700 |
| 8,855,334 B1* | 10/2014 | Lavine | H04M 19/04 | 381/119 |
| 8,996,538 B1* | 3/2015 | Cremer | G06F 16/433 | 707/758 |
| 9,838,731 B1* | 12/2017 | Matias | G11B 27/10 | |
| 9,942,581 B2* | 4/2018 | Jin | H04N 21/4542 | |
| 2003/0160944 A1* | 8/2003 | Foote | G11B 27/034 | |
| 2004/0085341 A1* | 5/2004 | Hua | G11B 27/28 | |
| 2005/0217462 A1* | 10/2005 | Thomson | G10H 1/368 | 84/612 |
| 2007/0030396 A1* | 2/2007 | Zhou | G11B 27/28 | 348/700 |
| 2007/0157795 A1* | 7/2007 | Hung | G10H 1/0008 | 84/600 |
| 2008/0215979 A1* | 9/2008 | Clifton | G06F 16/40 | 707/E17.009 |
| 2008/0316307 A1* | 12/2008 | Petersohn | G11B 27/28 | 348/E7.02 |
| 2009/0234888 A1* | 9/2009 | Holmes | G06F 16/639 | |
| 2010/0089224 A1* | 4/2010 | Fratti | G10H 1/40 | 84/612 |
| 2010/0124371 A1* | 5/2010 | Jiang | G06T 3/4007 | 382/162 |
| 2010/0250585 A1* | 9/2010 | Hagg | G06F 16/70 | 707/769 |
| 2010/0282045 A1* | 11/2010 | Chen | G10H 1/40 | 84/612 |
| 2013/0205223 A1* | 8/2013 | Gilbert | G06Q 30/0269 | 715/748 |
| 2013/0339349 A1* | 12/2013 | Yang | G10H 1/0008 | 707/723 |
| 2015/0142147 A1* | 5/2015 | Stanghed | G06F 16/683 | 700/94 |
| 2015/0147045 A1* | 5/2015 | Birnkrant | G06V 20/47 | 386/241 |
| 2015/0160916 A1* | 6/2015 | Lothian | G10H 1/40 | 715/719 |
| 2015/0228310 A1* | 8/2015 | Lothian | G11B 27/10 | 386/285 |
| 2015/0234833 A1* | 8/2015 | Cremer | G06F 16/1787 | 707/626 |
| 2015/0243325 A1* | 8/2015 | Pacurariu | G11B 27/28 | 386/280 |
| 2016/0012857 A1* | 1/2016 | Leppänen | G11B 27/32 | 386/241 |
| 2017/0004858 A1* | 1/2017 | Ngiam | G10L 21/0356 | |
| 2017/0026719 A1* | 1/2017 | Zhiwen | G11B 27/031 | |
| 2017/0195700 A1* | 7/2017 | Jin | H04N 21/44008 | |
| 2017/0301372 A1* | 10/2017 | Jehan | G06F 16/635 | |
| 2018/0005614 A1* | 1/2018 | Vilermo | G10H 1/46 | |
| 2019/0238953 A1* | 8/2019 | Zhiwen | H04N 21/4825 | |

\* cited by examiner

Video Data Table (210)

| VIDEO DATA TABLE | | | | |
|---|---|---|---|---|
| TITLE | KEYWORDS | CREATOR | DATA | ~220 |
| HOCKEY HIGHLIGHTS | HOCKEY | JC1973 | MP4 DATA | ~230A |
| GREATEST DUNKS | BASKETBALL | RYAN | AVI DATA | ~230B |
| SOCCER TRAGEDIES | SOCCER | FIFA | QT DATA | ~230C |
| WORLD SERIES G7 2016 | BASEBALL | MLB | MP4 DATA | ~230D |

Audio Data Table (240)

| AUDIO DATA TABLE | | | | |
|---|---|---|---|---|
| TITLE | GENRE | TEMPO | DATA | ~250 |
| YAKETY SAX | HOKEY | 116 BPM | MP3 DATA | ~260A |
| FORGOTTEN DREAM | TRAGEDY | 60 BPM | WMA DATA | ~260B |
| DESTROY EVERYTHING | HARDCORE | 110 BPM | AAC DATA | ~260C |
| GOD SAVE THE QUEEN | PUNK | 148 BPM | WAV DATA | ~260D |

*FIG. 2*

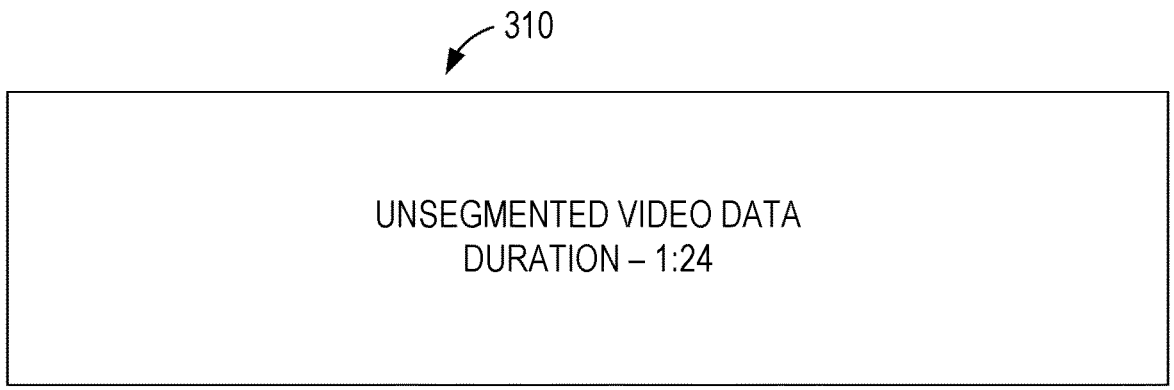
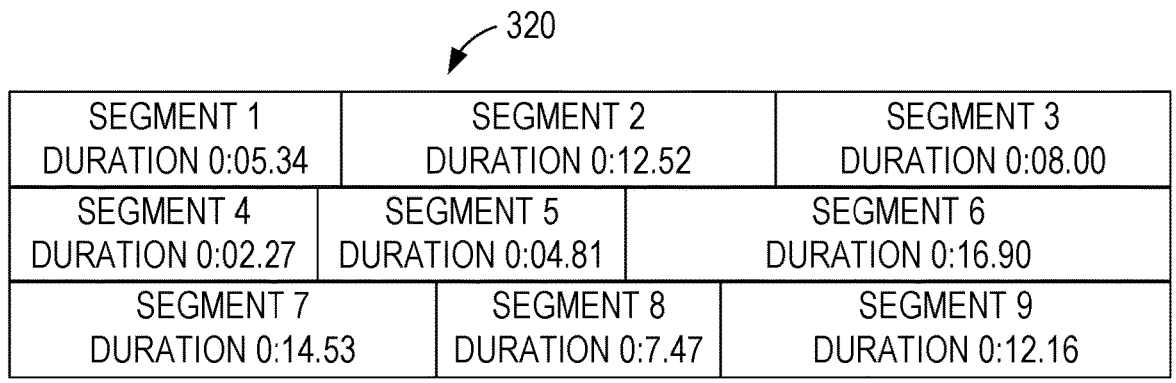
FIG. 3

GENERATING A VIDEO PRESENTATION TO ACCOMPANY AUDIO

TECHNICAL FIELD

The subject matter disclosed herein generally relates to audio/video presentations. Specifically, the present disclosure addresses systems and methods to generate a video presentation to accompany audio.

BRIEF DESCRIPTION OF THE DRAWINGS

Some embodiments are illustrated by way of example and not limitation in the figures of the accompanying drawings.

FIG. 2 is a block diagram illustrating a database, according to some example embodiments, suitable for generating a video presentation to accompany audio.

FIG. 3 is a block diagram illustrating segmented and unsegmented video data, according to some example embodiments, suitable for generating a video presentation to accompany audio.

DETAILED DESCRIPTION

Example methods and systems for generating a video presentation to accompany audio are described. An audio track is selected explicitly or implicitly. An audio track may be selected explicitly by a user selecting the audio track from a set of available audio tracks. An audio track may be selected implicitly by automatically selecting the audio track from a set of audio tracks based on a mood of the audio track, a genre of the audio track, a tempo of the audio track, or any suitable combination thereof.

The video presentation to accompany the audio track is generated from one or more video sequences. The video sequences may be selected explicitly by the user or selected from a database of video sequences using search criteria. In some example embodiments, the video sequences are divided into video segments that correspond to discontinuities between frames. Video segments are concatenated to form a video presentation to which the audio track is added.

In some example embodiments, only video segments having a duration equal to an integral number of beats of music in the audio track are used to form the video presentation. In these example embodiments, transitions between video segments in the video presentation that accompanies the audio track are aligned with the beats of the music.

In the following description, for purposes of explanation, numerous specific details are set forth to provide a thorough understanding of example embodiments. It will be evident to one skilled in the art, however, that the present subject matter may be practiced without these specific details.

Figure 1:
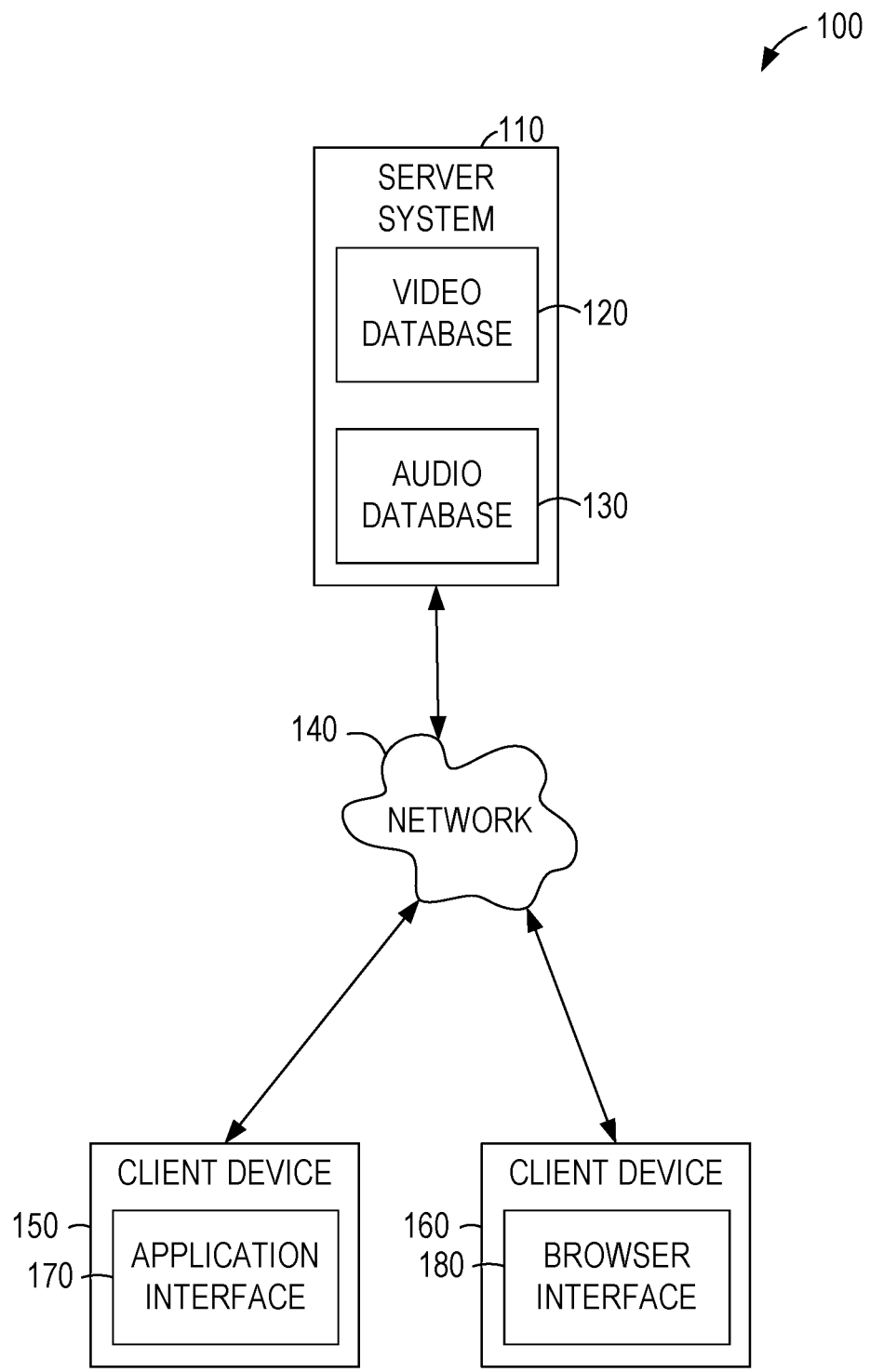
FIG. 1 is a block diagram illustrating a network environment, according to some example embodiments, suitable for generating a video presentation to accompany audio.

FIG. 1 is a network diagram illustrating a network environment 100 suitable for generating a video presentation to accompany audio, according to some example embodiments. The network environment 100 may include a server system 110 and a client device 150 or 160 connected by a network 140. The server system 110 comprises a video database 120 and an audio database 130.

A client device 150 or 160 is any device capable of receiving and presenting a stream of media content (e.g., a television, second set-top box, a laptop or other personal computer (PC), a tablet or other mobile device, a digital video recorder (DVR), or a gaming device). The client device 150 or 160 may also include a display or other user interface configured to display the generated video presentation. The display may be a flat-panel screen, a plasma screen, a light emitting diode (LED) screen, a cathode ray tube (CRT), a liquid crystal display (LCD), a projector, or any suitable combination thereof. A user of the client device 150 or 160 may interact with the client device via an application interface 170 or a browser interface 180.

The network 140 may be any network that enables communication between devices, such as a wired network, a wireless network (e.g., a mobile network), and so on. The network 140 may include one or more portions that constitute a private network (e.g., a cable television network or a satellite television network), a public network (e.g., over-the-air broadcast channels or the Internet), and so on.

In some example embodiments, the client device 150 or 160 sends a request to the server system 110 via the network 140. The request identifies a search query for video content and a genre of music. Based on the genre of music, the server system 110 identifies an audio track from the audio database 130. Based on the search query for video content, the server system 110 identifies one or more video sequences from the video database 120. Using methods disclosed herein, the server system 110 generates a video presentation comprising the identified audio track and video segments from the one or more identified video sequences. The server system 110 may send the generated video presentation to the client device 150 or 160 for presentation on a display device associated with the client device.

As shown in FIG. 1, the server system 110 comprises the video database 120 and the audio database 130. In some example embodiments, the video database 120, the audio database 130, or both are implemented in a separate computer system accessible by the server system 110 (e.g., over the network 140 or another network).

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" is a data storage resource and may store data structured as a text file, a table, a spreadsheet, a relational database, a document store, a key-value store, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or databases may be located at any of the machines, databases, or devices shown in FIG. 1. For example, the client device 150 may include the video database 120 and the audio database 130, and transmit identified video and audio data to the server system 110, among other configurations.

FIG. 2 is a block diagram illustrating a database schema 200, according to some example embodiments, suitable for generating a video presentation to accompany audio. The database schema 200 includes a video data table 210 and an audio data table 240. The video data table 210 uses the fields 220, providing a title, keywords, a creator, and data for each row in the table (e.g., the rows 230A-230D). The video data may be in a variety of formats such as Moving Pictures Expert Group (MPEG)-4 Part 14 (MP4), Audio Video Interleaved (AVI), or QuickTime (QT).

The audio data table 240 uses the fields 250, providing a title, a genre, a tempo, and data for each row in the table (e.g., the rows 260A-260D). The audio data may be in a variety of formats such as MPEG-3 (MP3), Windows Media Audio (WMA), Advance Audio Coding (AAC), or Windows Wave (WAV).

FIG. 3 is a block diagram illustrating segmented and unsegmented video data, according to some example embodiments, suitable for generating a video presentation to accompany audio. Unsegmented video data 310 is shown as having a duration of one-minute-twenty-four seconds. Segmented video data 320 comprises the same video content, broken up into nine segments of varying individual durations, but still with the same total duration of one-minute-twenty-four seconds. In some example embodiments, the segments of video data are identified based on differences between sequential frames of the unsegmented video data. For example, a distance measure between successive frames may be compared to a predetermined threshold. When the distance measure exceeds the threshold, the successive frames may be determined to be part of different segments. An example distance measure is the sum of the absolute value of the difference between corresponding pixels in RGB space. To illustrate, in a 1080 by 1920 high-definition frame, the difference in RGB values between each pair of corresponding pixels (of the 2,073,600 pixels) is determined, the absolute value taken, and the 2,073,600 resulting values summed. When the distance is 0, the two frames are identical.

Figure 4:
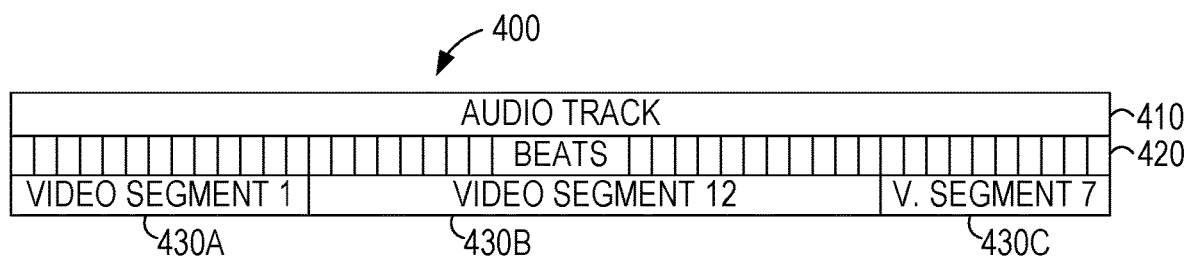
FIG. 4 is a block diagram illustrating alignment of an audio track with video segments in a video presentation that accompanies audio, according to some example embodiments.

FIG. 4 is a block diagram 400 illustrating alignment of an audio track with video segments in a video presentation that accompanies audio, according to some example embodiments. The block diagram 400 includes an audio track 410, beats 420, and video segments 430A, 430B, and 430C. The beats 420 indicate the moments within the audio track 410 at which beats occur. For example, if the music in the audio track 410 has a tempo of 120 BPM, the beats 420 are spaced at 0.5 second intervals. The video segments 430A-430C are aligned with the beats 420. Thus, the transition between the video segment 430A and the video segment 430B occurs on a beat. The video segments 430A-430C may be obtained from different video sequences (e.g., from the video data table 210) or from a single video sequence. Furthermore, the video segments 430A-430C may be aligned with the audio track 410 in the same order as the video segments are present within originating video sequences (e.g., the video sequence of FIG. 3) or in a different order.

In some example embodiments, events other than scene transitions are aligned with the beats 420 of the audio track 410. For example, in a compilation of knockouts in boxing, each of the video segments 430A-430C may be aligned with the audio track 410 such that the timing of the landing of a knockout blow is on a beat.

The beats 420 may indicate a subset of the beats of the audio track 410. For example, the beats 420 may be limited to the strong beat or down beat of the music. The strong beat may be detected by detecting the strength or energy of the song on each beat and identifying the beat with the highest energy. For example, in music using 4/4 time, one or two of each group of four beats may have higher energy than the other beats. Accordingly, the beats 420 used for alignment may be limited to one or two of each group of four beats.

In some example embodiments, the transition points in the audio track 410 may be identified by an audio signal other than the beats 420. For example, an audio track that contains a recording of a running horse instead of music may have transition points identified by the striking hoof beats of the horse. As another example, an audio track that contains a portion of the audio of a movie or television show may have transition points identified by the audio energy exceeding a threshold, such as people yelling, gunshots, vehicles coming close to the microphone, or any suitable combination thereof.

Figure 5:
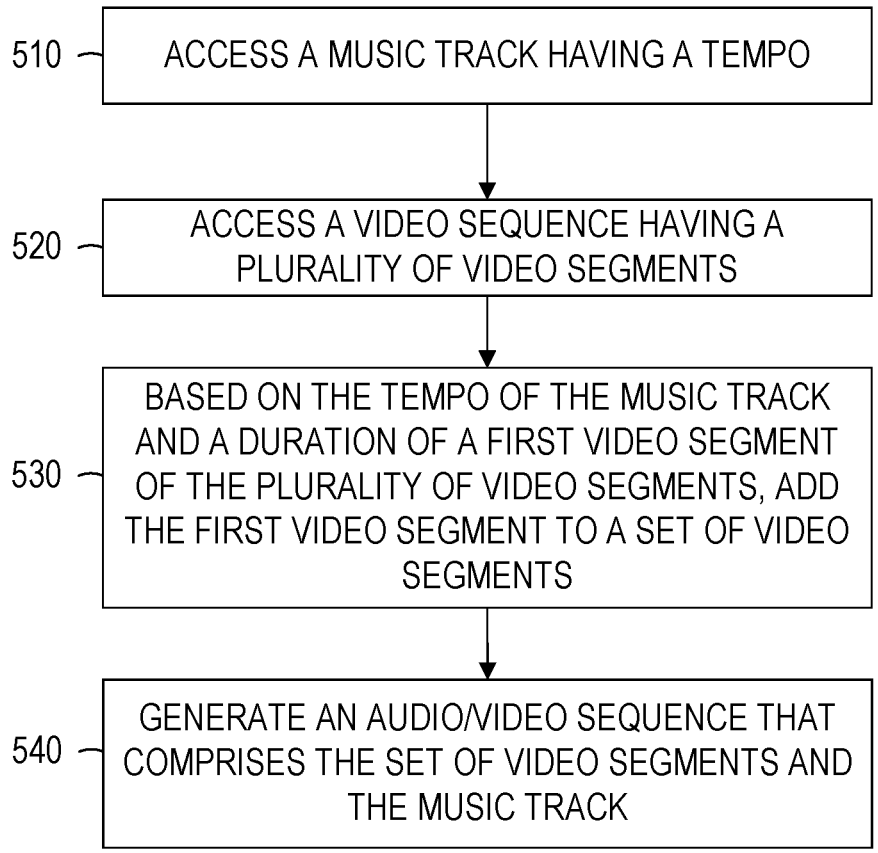
FIG. 5 is a flowchart illustrating a process, in some example embodiments, for generating a video presentation to accompany audio.

FIG. 5 is a flowchart illustrating a process 500, in some example embodiments, for generating a video presentation to accompany audio. By way of example and not of limitation, the operations of the process 500 are described as being performed by the systems and devices of FIG. 1, using the database schema 200.

In operation 510, the server system 110 accesses a music track that has a tempo. For example, the music track of the row 260A may be accessed from the audio data table 240. In some example embodiments, the client device 150 or 160 presents a user interface to a user via the application interface 170 or the browser interface 180. The presented user interface includes an option that enables the user to select a tempo (e.g., a text field to enter a numeric tempo, a drop-down list of predefined tempos, a combo box comprising a text field and a drop-down list, or any suitable combination thereof). The client device 150 or 160 transmits the received tempo to the server system 110, and the server system 110 selects the accessed music track based on the tempo. For example, a query may be run against the audio data table 240 of the audio database 130 to identify rows with the selected tempo (or within a predetermined range of the selected tempo, e.g., within 5 BPM of the selected tempo).

In other example embodiments, a user interface includes an option that enables the user to select a genre. The client device transmits the received genre to the server system 110, and the server system 110 selects the accessed music track based on the genre. For example, a query may be run against the audio data table 240 of the audio database 130 to identify rows with the selected genre. Additionally or alternatively, the user may select a mood to select the audio track. For example, the audio data table 240 may be expanded to include one or more moods for each song and rows matching the user-selected mood used in operation 510. In some example embodiments, mood of the audio track is determined based on tempo (e.g., slow corresponds to sad, fast corresponds to angry, medium corresponds to happy), key (e.g., music in a major key is happy, music in a minor key is sad), instruments (e.g., bass is somber, piccolo is cheerful), keywords (e.g., happy, sad, angry, or any suitable combination thereof), or any suitable combination thereof.

The server system 110, in operation 520, accesses a video track that has a plurality of video segments. For example, the video sequence of row 230A may be accessed from the video data table 210, with video segments as shown in the segmented video data 320. The video sequence may be selected by a user (e.g., from a list of available video sequences) or automatically. For example, a video track with a mood that matches the mood of the audio track may be automatically selected. In some example embodiments, mood of the video track is determined based on facial recognition (e.g., smiling faces are happy, crying faces are sad, serious faces are somber), colors (e.g., bright colors are happy, desaturated colors are sad), recognized objects (e.g., rain is sad, weapons are aggressive, toys are happy), or any suitable combination thereof.

In some example embodiments, the accessed video track is selected by the server system 110 based on the tempo and keywords associated with the video track in the video data table 210. For example, video tracks associated with the keyword "hockey" may be likely to be composed of many short video segments, and video tracks associated with the keyword "soccer" may be likely to be composed of longer video segments. Accordingly, a video track associated with the keyword "hockey" may be selected when the tempo is fast (e.g., over 110 BPM) and a video track associated with the keyword "soccer" may be selected when the tempo is slow (e.g., under 80 BPM).

In operation 530, based on the tempo of the music track and a duration of a first video segment of the plurality of video segments, the server system 110 adds the first video segment to a set of video segments. For example, one or more video segments of the video sequence having a duration that is an integral multiple of the beat period of the music track may be identified and added to a set of video segments that can be synchronized with the music track. To illustrate, if the tempo of the music track is 120 BPM, the beat period of the music track is 0.5 seconds and the video segments that are integral multiples of 0.5 seconds in duration are identified as being able to be played along with the music track with transitions between the video segments being synchronized with the beat of the music.

In some example embodiments, video segments that are within a predetermined number of frames of an integral multiple of the beat period are modified to align with the beat and added to the set of video segments in operation 530. For example, if the frame rate of the video is 30 frames per second and the beat period is 0.5 seconds, or 15 frames, then a video segment that is 46 frames long is only one frame too long for alignment. By removing the first or last frame of the video segment, an aligned video segment is generated that may be used in operation 540. Similarly, a video segment that is 44 frames long is only one frame too short for alignment. By duplicating the first or last frame of the video segment, an aligned video segment is generated.

The server system 110 generates, in operation 540, an audio/video sequence that comprises the set of video segments and the audio track. For example, the audio/video sequence of FIG. 4 includes three video segments 430A-430C that can be played while the audio track 410 is played, with transitions between the video segments 430A-430C aligned with the beat of the audio track 410. The generated audio/video sequence may be stored in the video database 120 for later access, transmitted to the client device 150 or 160 for playback to a user, or both.

In some example embodiments, one or more portions of the audio track are used in place of the entire audio track. For example, the audio track may be divided into a chorus and a number of verses. The audio/video sequence may be prepared using the chorus, a subset of the verses, or any suitable combination thereof. The selection of the portions may be based on a desired length of the audio/video sequence. For example, a three-minute song may be used to generate a one-minute audio/video sequence by selecting a one-minute portion of the song. The selected one minute may be the first minute of the song, the last minute of the song, a minute beginning at the start of the first chorus, one or more repetitions of the chorus, one or more verses without the chorus, or another combination of verses and the chorus.

In some example embodiments, multiple audio tracks are used in place of a single audio track. For example, the user may request a five-minute video with punk music. Multiple songs in the punk genre may be accessed from the audio data table 240, each of which is less than five minutes long. Two or more of the too-short punk tracks may be concatenated to generate a five-minute audio track. The tracks to be concatenated may also be selected based on matching tempo. For example, two songs at 120 BPM may be selected instead of one song at 120 BPM and another song at 116 BPM. Alternatively, the tempo of one or more songs may be adjusted to match. For example, the song at 120 BPM may be slowed to 118 BPM and the song at 116 BPM may be sped up to 118 BPM. Either of these methods avoids the possibility that the tempo of the audio/video sequence will change partway through.

Figure 6:
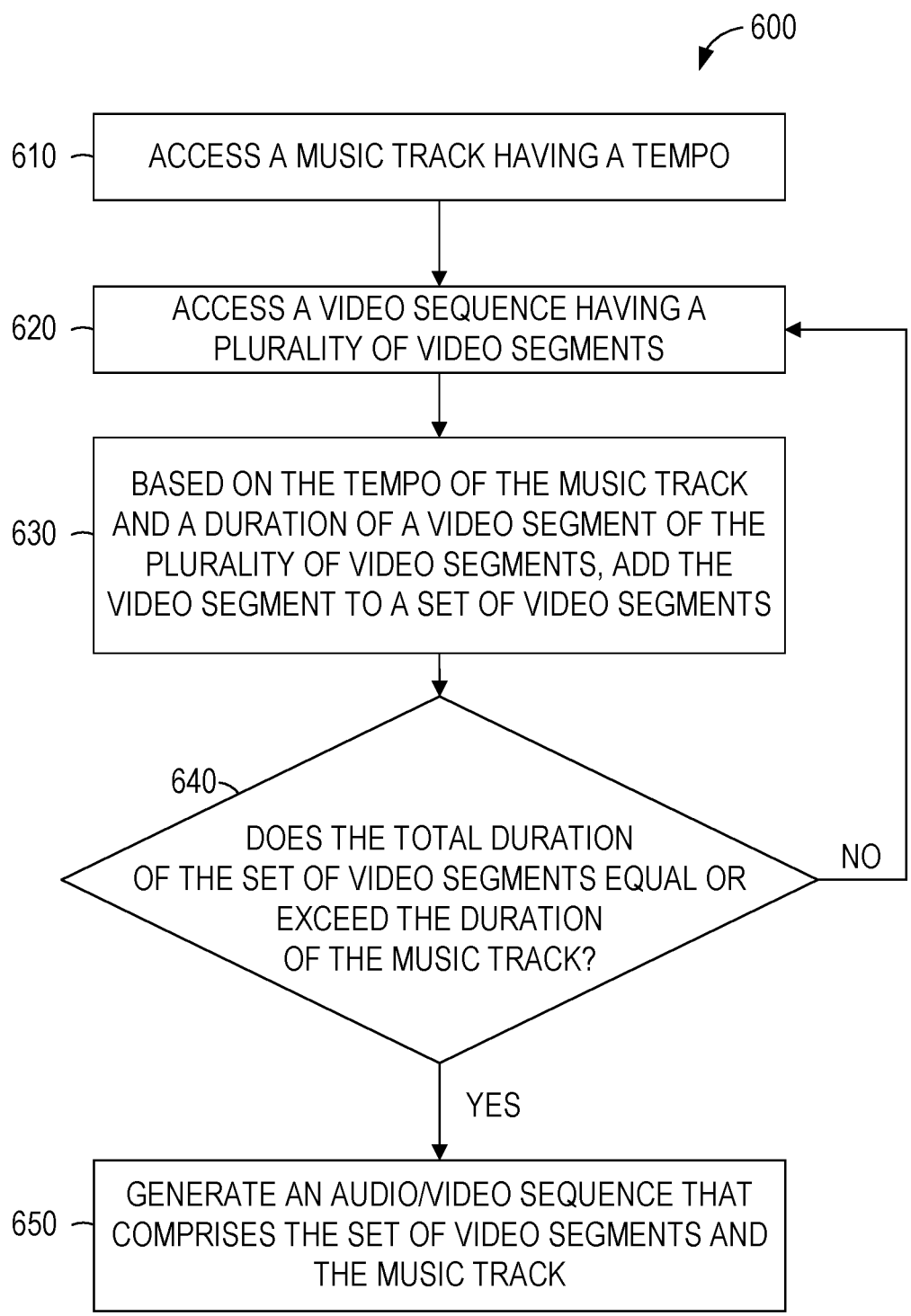
FIG. 6 is a flowchart illustrating a process, in some example embodiments, for generating a video presentation to accompany audio.

FIG. 6 is a flowchart illustrating a process 600, in some example embodiments, for generating a video presentation to accompany audio. By way of example and not of limitation, the operations of the process 600 are described as being performed by the systems and devices of FIG. 1, using the database schema 200.

In operation 610, the server system 110 accesses a music track that has a tempo. For example, the music track 260A may be accessed from the audio data table 240.

The server system 110, in operation 620, accesses a video track that has a plurality of video segments. For example, the video sequence of row 230A may be accessed from the video data table 210, with video segments as shown in the segmented video data 320.

In operation 630, based on the tempo of the music track and a duration of a video segment of the plurality of video segments, the server system 110 adds the video segment to a set of video segments. For example, a video segment of the video sequence having a duration that is an integral multiple of the beat period of the music track may be identified and added to a set of video segments that can be synchronized with the music track.

The server system 110 determines whether the total duration of the set of video segments equals or exceeds the duration of the music track in operation 640. For example, if the music track is one minute long, only one video segment has been added to the set of video segments, and that video segment is 30 seconds long, operation 640 will determine that the total duration of 30 seconds is less than the duration of the music track. If the total duration does not equal or exceed the duration of the music track, the process 600 repeats the operations 620-640, adding another video segment to the set of video segments and repeating the duration check. When the total duration of the set of video segments meets or exceeds the duration of the music track, the process 600 continues with the operation 650.

In alternative embodiments, the comparison of operation 640 is not with the duration of the music track but with another duration. For example, a user may select a duration for the audio/video sequence. The duration may be shorter than the duration of the music track, in which case the music track may be truncated to the selected duration. The user-selected duration may be longer than the duration of the music track, in which case the music track may be repeated to reach the selected duration or an additional music track of the same tempo may be retrieved from the audio data table 240 and appended to the first music track.

In operation 650, the server system 110 generates an audio/video sequence that comprises the set of music segments and the video track. For example, the audio/video sequence of FIG. 4 includes three video segments 430A-430C that can be played while the audio track 410 is played, with transitions between the video segments 430A-430C aligned with the beat of the audio track 410. The generated audio/video sequence may be stored in the video database 120 for later access, transmitted to the client device 150 or 160 for playback to a user, or both. In some example embodiments, when the total duration of the set of video segments exceeds the duration of the music track, one video segment (e.g., the last video segment) is truncated to align the durations.

Figure 7:
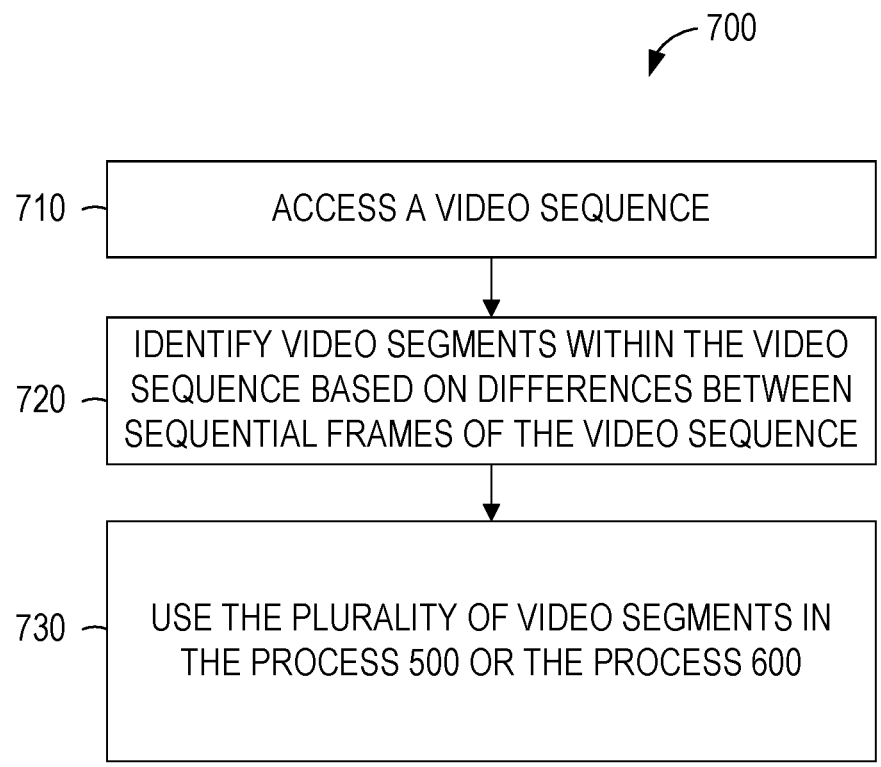
FIG. 7 is a flowchart illustrating a process, in some example embodiments, for generating a video presentation to accompany audio.

FIG. 7 is a flowchart illustrating a process 700, in some example embodiments, for generating a video presentation to accompany audio. By way of example and not of limitation, the operations of the process 700 are described as being performed by the systems and devices of FIG. 1, using the database schema 200.

In operation 710, the server system 110 accesses a video sequence. For example, the server system 110 may provide a web page that is rendered in the browser interface 180 of the client device 160. Using the web page, a user enters one or more keywords to identify desired video sequences to be used for an audio/video presentation. In this example, the server system 110 accesses the video sequence of row 230A from the video data table 210 based on matches between user-provided keywords and keywords stored in the row 230A.

The server system 110 identifies video segments within the video sequence based on differences between sequential frames of the video sequence in operation 720. For example, a distance measure may be calculated for each pair of sequential frames. When the distance measure exceeds a threshold, the pair of sequential frames may be determined to be in separate segments. One example distance measure is the sum of the absolute values of the differences in the color values of corresponding pixels in the two frames. Thus, two identical frames would have a distance measure of zero.

In operation 730, the plurality of identified video segments are used in the process 500 or the process 600 (e.g., in operation 520 or operation 620) to generate an audio/video sequence that comprises one or more of the identified video segments and a music track.

Figure 8:
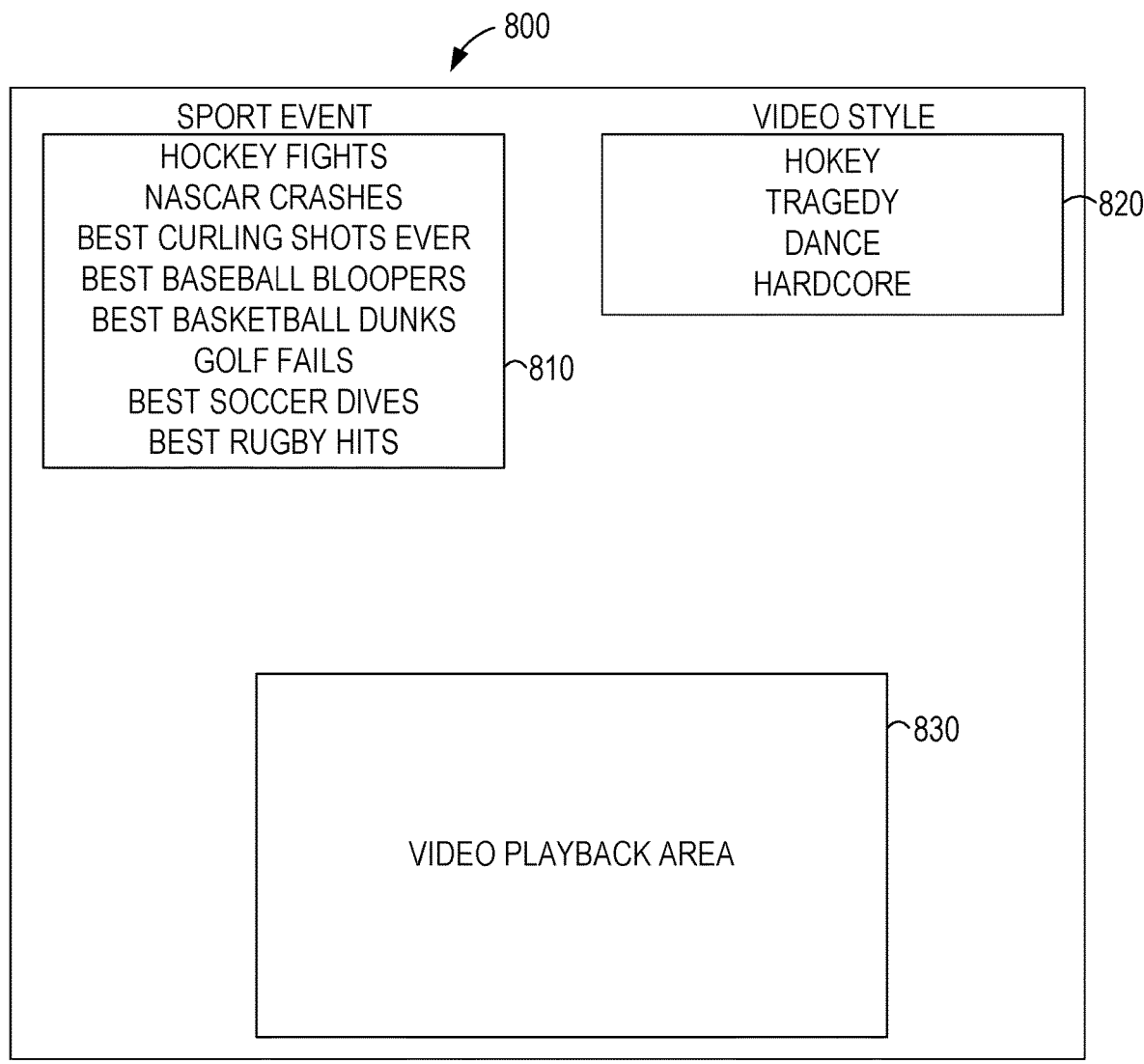
FIG. 8 is a block diagram illustrating a user interface, in some example embodiments, for generating a video presentation to accompany audio.

FIG. 8 is a block diagram illustrating a user interface 800, in some example embodiments, for generating a video presentation to accompany audio. The user interface 800 includes a sport event selector 810, a video style selector 820, and a video playback area 830. The user interface 800 may be presented by the application interface 170 or the browser interface 180 to a user.

The user may operate the sport event selector 810 to select a sport. For example, a drop-down menu may be presented that allows the user to select from a set of predefined options (e.g., football, hockey, or basketball). Similarly, the user may operate the video style selector 820 to select a video style. The video style may correspond to a genre of music.

In response to receiving the selected sport and video style, the client device 150 or 160 may send the selections to the server system 110. Based on the selections, the server system 110 identifies audio and video data from the audio database 130 and the video database 120 to be used in performing one or more of the processes 500, 600, and 700. After generating a video presentation to accompany audio (e.g., via the process 500 or 600), the server system 110 transmits the generated video presentation over the network 140 to the client device 150 or 160 for display in the video playback area 830. The client device 150 or 160 causes the received video presentation to be played in the video playback area 830 for the user.

According to various example embodiments, one or more of the methodologies described herein may facilitate generating a video presentation to accompany audio. Accordingly, one or more of the methodologies described herein may obviate a need for certain efforts or resources that otherwise would be involved in generating a video presentation to accompany audio. Computing resources used by one or more machines, databases, or devices (e.g., within the network environment 100) may be reduced by using one or more of the methodologies described herein. Examples of such computing resources include processor cycles, network traffic, memory usage, data storage capacity, power consumption, and cooling capacity.

Figure 9:
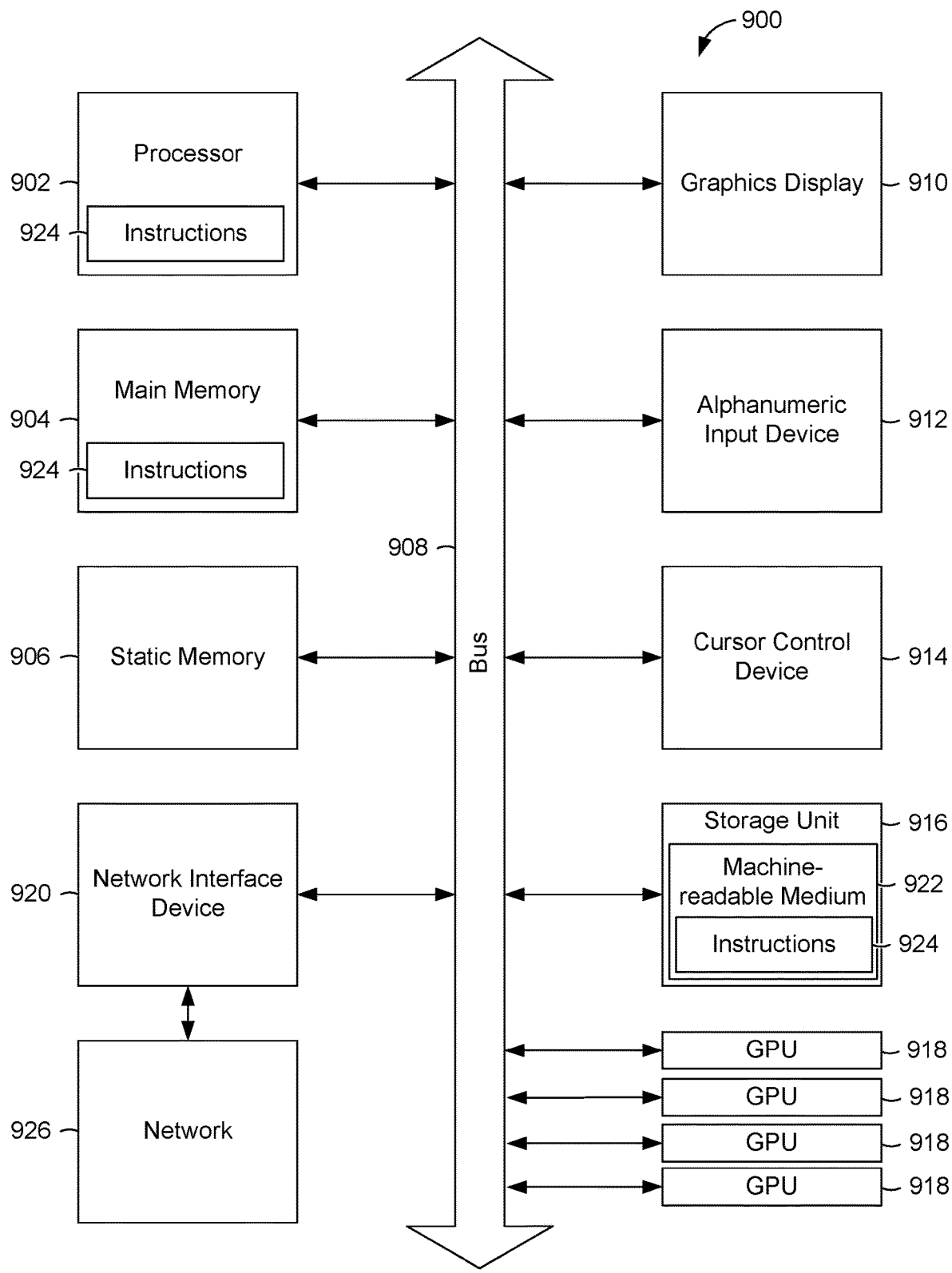
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a PC, a tablet computer, a laptop computer, a netbook, a set-top box (STB), a smart TV, a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an ASIC, a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a LED display, a LCD, a projector, or a CRT). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, one or more GPUs 918, and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 140 of FIG. 1) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "non-transitory machine-readable medium" refers to a machine-readable medium and excludes signals per se.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A tangible, non-transitory machine-readable medium comprising instructions that, when executed by one or more processors, cause a computing device to perform a set of operations comprising:
    accessing a music track comprising a tempo corresponding to a frequency of beats in the music track;
    accessing a video sequence;
    identifying a plurality of transitions within the video sequence; and
    generating an audio/video sequence that comprises the video sequence and a portion of the music track, wherein the portion of the music track is identified based on a duration of the audio/video sequence, and wherein the portion of the music track comprises a subset portion of at least one of: (i) a chorus of the music track and (ii) a verse of the music track, and wherein generating the audio/video sequence comprises modifying a duration of the video sequence between the plurality of transitions such that the plurality of transitions align with respective beats of the subset portion of the music track.

2. The tangible, non-transitory machine-readable medium of claim 1, wherein generating the audio/video sequence comprises generating the audio/video sequence with a predetermined duration.

3. The tangible, non-transitory machine-readable medium of claim 1, wherein generating the audio/video sequence comprises generating the audio/video sequence with a duration equal to the duration of the music track.

4. The tangible, non-transitory machine-readable medium of claim 1, wherein generating the audio/video sequence comprises generating the audio/video sequence with a user-selected duration.

5. The tangible, non-transitory machine-readable medium of claim 1, wherein modifying the duration of the video sequence between the plurality of transitions comprises modifying the duration of the video sequence between a first and second transitions to be an integral multiple of a beat period of the music track.

6. The tangible, non-transitory machine-readable medium of claim 1, wherein the set of operations further comprises:
    measuring respective distances between successive frames in the video sequence; and
    based on a plurality of the respective distances between successive frames in the video sequence, identifying transitions within the video sequence.

7. The tangible, non-transitory machine-readable medium of claim 6, wherein the identified transitions include a first transition after a beginning of the video sequence and a second transition before an end of the video sequence, and wherein the identified transitions indicate one or more events of the video sequence.

8. The tangible, non-transitory machine-readable medium of claim 1, wherein the set of operations further comprises receiving a selection of a tempo, and wherein the music track comprising a tempo corresponding to a frequency of beats in the music track is based on the selected tempo.

9. The tangible, non-transitory machine-readable medium of claim 1, wherein the set of operations further comprises accessing a search query, and the accessing the video sequence is based on the search query.

10. A computer-implemented method comprising:
    accessing a music track comprising a tempo corresponding to a frequency of beats in the music track;
    accessing a video sequence;
    identifying a plurality of transitions within the video sequence; and generating an audio/video sequence that comprises the video sequence and a portion of the music track, wherein the portion of the music track is identified based on a duration of the audio/video sequence, and wherein the portion of the music track comprises a subset portion of at least one of: (i) a chorus of the music track and (ii) a verse of the music track, and wherein generating the audio/video sequence comprises modifying a duration of the video sequence between the plurality of transitions such that the plurality of transitions align with respective beats of the subset portion of the music track.

11. The computer-implemented method of claim 10, wherein generating the audio/video sequence comprises generating the audio/video sequence with a predetermined duration.

12. The computer-implemented method of claim 10, wherein generating the audio/video sequence comprises generating the audio/video sequence with a duration equal to the duration of the music track.

13. The computer-implemented method of claim 10, wherein generating the audio/video sequence comprises generating the audio/video sequence with a user-selected duration.

14. The computer-implemented method of claim 10, wherein modifying the duration of the video sequence between the plurality of transitions comprises modifying the duration of the video sequence between a first and second transitions to be an integral multiple of a beat period of the music track.

15. The computer-implemented method of claim 10, further comprising:
measuring respective distances between successive frames in the video sequence; and
based on a plurality of the respective distances between successive frames in the video sequence, identifying transitions within the video sequence.

16. The computer-implemented method of claim 15, wherein the identified transitions include a first transition after a beginning of the video sequence and a second transition before an end of the video sequence, and wherein the identified transitions indicate one or more events of the video sequence.

17. The computer-implemented method of claim 10, further comprising receiving a selection of a tempo, and wherein the music track comprising a tempo corresponding to a frequency of beats in the music track is based on the selected tempo.

18. A computing device comprising:
one or more processors; and
a tangible, non-transitory machine-readable medium comprising instructions that, when executed by the one or more processors, cause the computing device to perform a set of operations comprising:
accessing a music track comprising a tempo corresponding to a frequency of beats in the music track;
accessing a video sequence;
identifying a plurality of transitions within the video sequence; and
generating an audio/video sequence that comprises the video sequence and a portion of the music track, wherein the portion of the music track is identified based on a duration of the audio/video sequence, and wherein the portion of the music track comprises a subset portion of at least one of: (i) a chorus of the music track and (ii) a verse of the music track, and wherein generating the audio/video sequence comprises modifying a duration of the video sequence between the plurality of transitions such that the plurality of transitions align with respective beats of the subset portion of the music track.

19. The computing device of claim 18, wherein the set of operations further comprises:
measuring respective distances between successive frames in the video sequence; and
based on a plurality of the respective distances between successive frames in the video sequence, identifying transitions within the video sequence, wherein the identified transitions include a first transition after a beginning of the video sequence and a second transition before an end of the video sequence, and wherein the identified transitions indicate one or more events of the video sequence.

20. The computing device of claim 18, wherein the set of operations further comprises accessing a search query, and the accessing the video sequence is based on the search query.

* * * * *